United States Patent
Wu et al.

(10) Patent No.: US 10,497,276 B2
(45) Date of Patent: Dec. 3, 2019

(54) DISPLAY METHOD AND APPARATUS

(71) Applicant: BAIDU ONLINE NETWORK TECHNOLOGY (BEIJING) CO., LTD., Beijing (CN)

(72) Inventors: Zhongqin Wu, Beijing (CN); Hui Qiao, Beijing (CN); Yingchao Li, Beijing (CN); Qian Ying, Beijing (CN); Chen Zhao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/619,177

(22) Filed: Jun. 9, 2017

(65) Prior Publication Data
US 2018/0190030 A1    Jul. 5, 2018

(30) Foreign Application Priority Data
Dec. 30, 2016   (CN) .......................... 2016 1 1254677

(51) Int. Cl.
| | | |
|---|---|---|
| G09B 5/06 | (2006.01) | |
| G06F 3/01 | (2006.01) | |
| G06F 3/16 | (2006.01) | |
| G09B 19/00 | (2006.01) | |
| G09B 23/00 | (2006.01) | |

(52) U.S. Cl.
CPC .............. *G09B 19/00* (2013.01); *G06F 3/011* (2013.01); *G06F 3/017* (2013.01); *G09B 5/065* (2013.01); *G06F 3/167* (2013.01); *G09B 23/00* (2013.01)

(58) Field of Classification Search
None
See application file for complete search history.

(56) References Cited

U.S. PATENT DOCUMENTS

| | | | | |
|---|---|---|---|---|
| 2014/0028711 | A1* | 1/2014 | Kincaid ................... | G09G 3/20 345/633 |
| 2015/0054784 | A1* | 2/2015 | Kim ...................... | G06F 3/0416 345/174 |
| 2015/0212583 | A1* | 7/2015 | Shen ..................... | G06F 3/0425 345/156 |

FOREIGN PATENT DOCUMENTS

CN              105702098 A        6/2016

* cited by examiner

*Primary Examiner* — Yanna Wu
(74) *Attorney, Agent, or Firm* — Marshall, Gerstein & Borun LLP

(57) ABSTRACT

The present disclosure discloses a display method and apparatus. A specific implementation of the method comprises: acquiring an experimental environment image; presenting, on the experimental instrument image using an augmented reality approach, a status image indicating an experimental status of an experimental instrument when performing the target experiment; in response to detecting a gesture operation of a user, determining experiment effect information of an experiment operation based on a corresponding relation between the gesture operation and the experiment operation of the target experiment, wherein the experiment effect information comprises an experiment effect image; and displaying, using the augmented reality approach, the experiment effect image in the experimental environment image having presented the status image. This implementation may superpose a virtual status image and an experiment effect image on a reality environment image, thereby enhancing the display fidelity.

14 Claims, 6 Drawing Sheets

DISPLAY METHOD AND APPARATUS

CROSS-REFERENCE TO RELATED APPLICATION

This application is related to and claims priority from Chinese Patent Application No. 201611254677.3, filed on Dec. 30, 2016, entitled "Display Method and Apparatus," the entire disclosure of which is hereby incorporated by reference.

TECHNICAL FIELD

The present disclosure relates to the field of computer technologies, particularly to the field of augmented reality technologies, and more particularly, to a display method and apparatus.

BACKGROUND

In the learned fields such as chemistry, biology, medical services, machinery and automobile services, there are many experimental courses. Offering the experimental courses needs the provision of expensive experimental instruments, in addition, certain danger exists in the event of misoperation.

However, in the existing art, users may watch experiment course videos to get an impression of the users on the experiments. A problem of low display fidelity exists when this approach of playing experiment videos is adopted for experimental training.

SUMMARY

An objective of the present disclosure is to provide an improved display method and apparatus, in order to solve the technical problem mentioned in the foregoing Background section.

In a first aspect, the present disclosure provides a display method. The method comprises: acquiring an experimental environment image, wherein the experimental environment image comprises an experimental instrument image of an experimental instrument for completing a target experiment; presenting, on the experimental instrument image using an augmented reality approach, a status image indicating an experimental status of the experimental instrument when performing the target experiment; in response to detecting a gesture operation of a user, determining experiment effect information of an experiment operation based on a corresponding relation between the gesture operation and an experiment operation of the target experiment, wherein the experiment effect information comprises an experiment effect image; and displaying, using the augmented reality approach, the experiment effect image in the experimental environment image having presented the status image.

In some embodiments, the experiment effect information further comprises sound effect information, and the method further comprises: playing sound indicated by the sound effect information.

In some embodiments, the experimental instrument image comprises an image of the experimental instrument for holding an experimental material required for the target experiment; and the method further comprises: presenting, on the experimental instrument image of the experimental instrument required for the target experiment using the augmented reality approach, an experimental material image of the experimental material required for the target experiment.

In some embodiments, the method further comprises: displaying experiment operation prompt information so that the user performs an experiment operation according to the experiment operation prompt information.

In some embodiments, the method further comprises: acquiring an experimental identification selected by the user; and determining an experiment indicated by the experimental identification as the target experiment.

In a second aspect, the present disclosure provides a display apparatus. The apparatus comprises: an acquiring unit, configured to acquire an experimental environment image, wherein the experimental environment image comprises an experimental instrument image of an experimental instrument for completing a target experiment; a first presenting unit, configured to present, on the experimental instrument image using an augmented reality approach, a status image indicating an experimental status of the experimental instrument when performing the target experiment; a determining unit, configured to in response to detecting a gesture operation of a user, determine experiment effect information of an experiment operation based on a corresponding relation between the gesture operation and an experiment operation of the target experiment, wherein the experiment effect information comprises an experiment effect image; and a first display unit, configured to display, using the augmented reality approach, the experiment effect image in the experimental environment image having presented the status image.

In some embodiments, the experiment effect information comprises sound effect information, and the apparatus further comprises: a playing unit, configured to play sound indicated by the sound effect information.

In some embodiments, the experimental instrument image comprises an image of the experimental instrument for holding an experimental material required for the target experiment, and the apparatus further comprises: a second presenting unit, configured to present, on the experimental instrument image of the experimental instrument required for the target experiment using the augmented reality approach, an experimental material image of the experimental material required for the target experiment.

In some embodiments, the apparatus further comprises: a second display unit, configured to display experiment operation prompt information so that the user performs an experiment operation according to the experiment operation prompt information.

In some embodiments, the apparatus further comprises: an experimental identification acquiring unit, configured to acquire an experimental identification selected by the user; and a target experiment determining unit, configured to determine an experiment indicated by the experimental identification as the target experiment.

According to the display method and apparatus provided by the present disclosure, by acquiring an experimental environment image, presenting, on the experimental instrument image using an augmented reality approach, a status image indicating an experimental status of an experimental instrument when performing the target experiment, determining experiment effect information of an experiment operation based on a corresponding relation between a gesture operation and the experiment operation of the target experiment in response to detecting the gesture operation of a user, wherein the experiment effect information comprises an experiment effect image, and displaying, using the augmented reality approach, the experiment effect image in the experimental environment image having presented the status image, a virtual status image and an experiment effect image may be superposed on a reality environment image, thereby enhancing a display fidelity.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
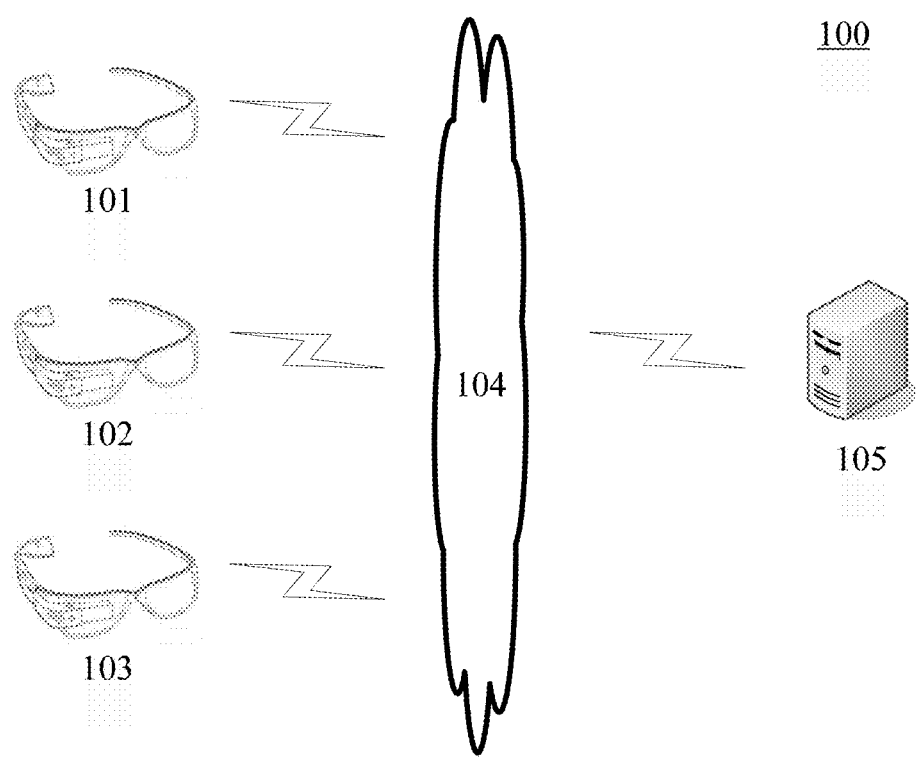
FIG. 1 is an exemplary architecture diagram of a system to which the present disclosure may be applied.

FIG. 1 shows an exemplary architecture of a system 100 which may be used by a method and apparatus for generating search report according to an embodiment of the present application.

As shown in FIG. 1, the system architecture 100 may comprise augmented reality devices 101, 102 and 103, a network 104 and a server 105. The network 104 is configured to provide a medium of a communications link between the augmented reality devices 101, 102 and 103 and the server 105. The network 104 may include various connection types, such as wired or wireless communications link or fiber-optic cable.

A user may interact with the server 105 via the network 104 by using the augmented reality devices 101, 102 and 103 to receive or send a message. Various applications for presenting augmented reality images and capturing environmental information and human body gesture information may be installed on the augmented reality devices 101, 102 and 103.

The augmented reality device may comprise an augmented reality display part, a speaker, a camera, a sensor, a central processing unit (CPU), a graphics processing unit (GPU), a communication part, and the like. The augmented reality display part, the speaker, the camera, the sensor, the CPU, the GPU, the communication part, and the like may be integrated into a wearable augmented reality device such as an augmented reality helmet. One or more parts in the augmented reality display part, the speaker, the camera, the sensor, the CPU, the GPU, the communication part, and the like may be separated from a part worn by the user for displaying the augmented reality image.

It is to be noted that the server 105 is selectable in the system architecture. Services provided by the server also may be alternatively completed by parts such as the CPU and the GPU in the augmented reality device.

The server 105 may be a server providing various services, for example, a background server constructing experimental environment images displayed on the augmented reality devices 101, 102 and 103. The background server may process, for example, analyze data such as a received experimental environment image constructing request, and feed back the processing result (such as the experimental environment image) to the augmented reality device.

It is to be noted that the display method provided by the embodiments of the present disclosure generally may be performed by the augmented reality devices 101, 102 and 103 (or may be performed by the server 105 for executing some steps). Correspondingly, the display apparatus generally is arranged in the augmented reality devices 101, 102 and 103, and some units or modules also may be arranged in the server 105.

It is to be understood that the number of the augmented reality devices, the networks and the servers is merely exemplary. Any number of the augmented reality devices, the networks and the servers may be provided as required.

Figure 2:
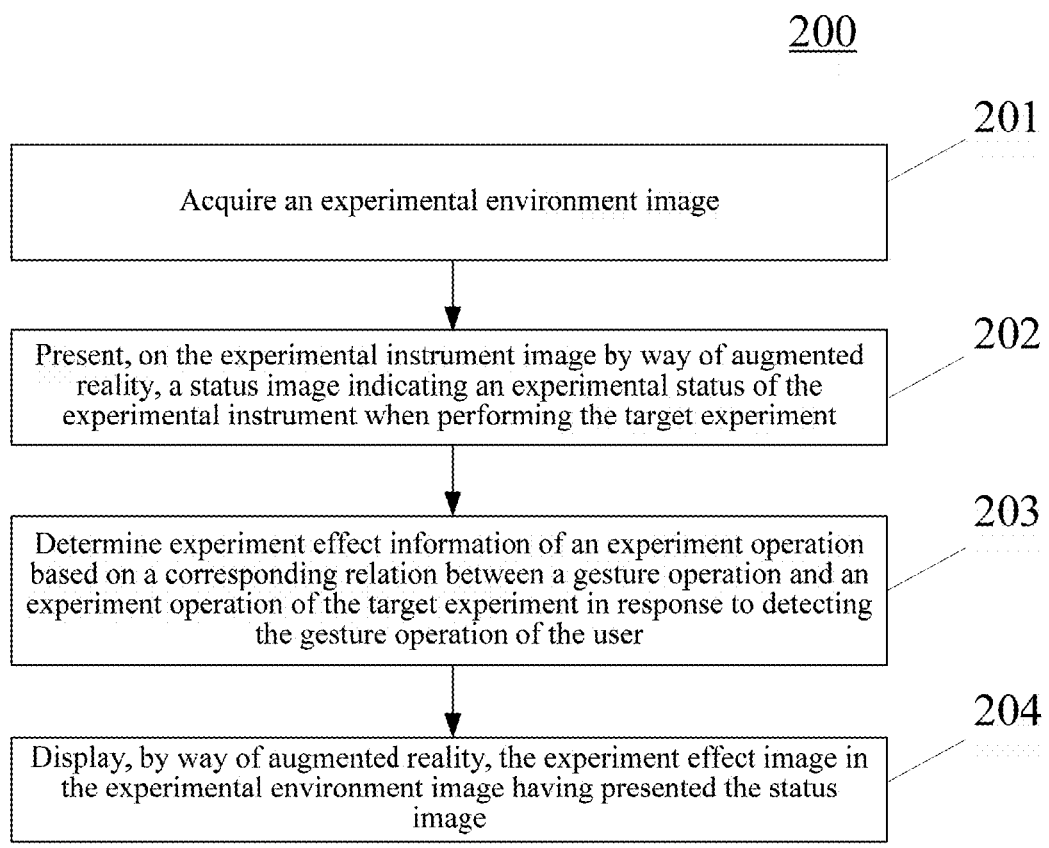
FIG. 2 is a flowchart of a display method according to an embodiment of the present disclosure.

Continuing referring to FIG. 2, a flow 200 of a display method according to an embodiment of the present disclosure is illustrated. The display method comprises following steps.

Step 201: acquiring an experimental environment image.

In this embodiment, an electronic device (such as an augmented reality device as shown in FIG. 1) on which the display method runs may receive, by various means, the experimental environment image. Herein, the experimental environment image comprises an experimental instrument image of an experimental instrument for completing a target experiment.

In some optional implementations of this embodiment, various camera devices integrated on the augmented reality devices may be utilized to acquire experimental environment information consistent with the user's view, and then the captured experimental environment information is processed by utilizing an image generating technique to obtain an experimental environment image. As an example, the experimental environment within the user's view range may comprise wall surface, desk, and scissors on the desk, etc.

In this embodiment, the experimental environment image may be an experimental environment image displayed on the display part of the user's augmented reality device, wherein the augmented reality device may be, for example, an augmented reality helmet or augmented reality glasses.

In this embodiment, the target experiment may be a preset experiment that needs to be completed this time. As an example, the target experiment may include, but not limited to, experiments in the professional fields such as chemistry, biology, medical services, machinery and automobile services.

In some optional implementations of this embodiment, the electronic device may first acquire an experimental identification selected by the user, and then determine an experiment indicated by the experimental identification as the target experiment.

In this embodiment, the experimental instrument may be various instruments used in specific natural science experiments. For example, common experimental instruments comprise: test tubes, beakers, evaporation pans, crucibles, alcohol burners, funnels, culture dishes, counter balances, triple prisms, microscopes, glass slides, and coverslips, etc.

In this embodiment, the experimental instrument image may be an experimental instrument image of an experimental instrument for completing the target experiment. Herein, the experimental instrument image may be obtained by processing an image captured by a physical experiment instrument, or may be obtained by adding a virtual experimental instrument image by the augmented reality device using the augmented reality approach.

In some optional implementations of this embodiment, experimental instrument information of the experimental instrument required for the target experiment may be acquired; and an experimental instrument image of the experimental instrument absent from the experimental environment information is added into the experimental environment image using the augmented reality approach according to the experimental instrument information. As an example, completing the target experiment needs three test tubes, however, there are only two physical test tubes in the experimental environment, and thus an augmented reality test tube image may be virtualized to be displayed in the experimental environment image.

In some optional implementations of this embodiment, a monocular camera or a binocular camera may be utilized to localize the user's visual sense in real time to acquire the experimental environment information consistent with the user's view.

In some optional implementations of this embodiment, three-dimensional point cloud data of experimental environment consistent with the user's view may be acquired using a real sense technique to serve as the acquired experimental environment information.

In some optional implementations of this embodiment, Simultaneous Localization And Mapping (SLAM) may be utilized to process the acquired experimental environment information to obtain the experimental environment image to be displayed in a display part (such as augmented reality glasses) of the augmented reality device of the user.

Step 202: presenting, on the experimental instrument image using an augmented reality approach, a status image indicating an experimental status of the experimental instrument when performing the target experiment;

In this embodiment, the electronic device may present the status image on the experimental instrument image using the augmented reality approach. Herein, the status image may be a status image indicating the experimental status of the experimental instrument when performing the target experiment.

In this embodiment, experimental status information of the experimental status of the experimental instrument when performing the target experiment may be preset. As an example, in an experiment involved with combustion, an experimental status of an alcohol burner is a combustion status, and experimental status information of the alcohol burner preset for the experiment involved with combustion is information indicating the combustion status.

In this embodiment, the status image may be a preset image. A status image set may be preset, then a required status image is searched from the status image set according to the status image required for the target experiment, and the status image is added for the experimental instrument image.

In some optional implementations of this embodiment, the experimental instrument image into which the status image is added may be an experimental instrument image of a physical experiment instrument in the experimental environment, or may be an augmented reality experimental instrument image obtained by virtualization.

Those skilled in the art may understand that as a technology seamlessly integrating real world information and virtual world information, the augmented reality technology may simulate and then superpose entity information (such as vision information, sound, taste and sense of touch) difficult to be experienced within certain time and space range in the real world by means of science and technology such as computers, and apply virtual information into the real world so that the virtual information is perceived by human sense organs, thereby achieving a sense experience beyond reality. A real environment and a virtual object are superposed, in real time, on the same picture or space so that they exist simultaneously. The augmented reality technology not only exhibits the real world information but also displays the virtual world information, and both the real world information and the virtual world information mutually complement and superpose. In the visualized augmented reality, users utilize head-mounted displays (HMD) to multiply synthesize real world and computer graphics, so that the users may see that the real world is embraced with the computer graphics. The augmented reality technology contains technologies and means such as multimedia, augmented reality modeling, real-time video display and control, multi-sensor fusion, real-time tracking and registration, and scene fusion.

In this embodiment, displaying a status image using the augmented reality approach may comprise superposing the virtual status information into the experimental environment image on which the user has a visual sense of immersion, and specifically presenting the same on the experimental instrument image corresponding to the status image.

Step 203: in response to detecting a gesture operation of the user, determining experiment effect information of an experiment operation based on a corresponding relation between the gesture operation and an experiment operation of the target experiment.

In this embodiment, the electronic device may determine experiment effect information of an experiment operation based on a corresponding relation between a gesture operation and an experiment operation of the target experiment in response to detecting the gesture operation of the user. Herein, the experiment effect information may comprise an experiment effect image.

In this embodiment, the target experiment may comprise one or more experiment operations, a corresponding relation between the experiment operation and the gesture operation may be preset, and experiment effect information that should appear upon completing the experiment operation may be preset for the experiment operation.

In this embodiment, the user's gesture operation may be detected by using various gesture recognizing devices integrated on the augmented reality device.

In some optional experimental implementations of this embodiment, the user's gesture operation may be detected by using a gesture sensor.

In some optional experimental implementations of this embodiment, an image of the user's gesture operation may be acquired by using a depth camera.

In some optional experimental implementations of this embodiment, the user's gesture operation may be recognized by using a monocular or binocular camera in combination with a deep learning technology. Recognition of the gesture operation based on the binocular camera is taken as an example, information including an augmented reality position is extracted by means of two cameras using a binocular stereoscopic visual imaging principle for a comprehensive analysis and judgment of gesture to establish a stereomodel of a hand part. First, left and right vision images of the operator's gesture action are captured by using the binocular camera to generate a depth image by means of a stereo vision algorithm. Specific process: a parallax image is obtained by stereo matching after acquiring a calibrated stereo image pair subject to stereo calibration, and a depth image is acquired by performing a trigonometric calculation using intrinsic parameters and extrinsic parameters of the camera. Next, the left (or right) vision image is processed by using a gesture segmentation algorithm to segment initial position information of the human hand, and the initial position is determined as an initial position of a gesture tracking algorithm. Next, the human hand movement is tracked using the gesture tracking algorithm. Next, the gesture is recognized according to a result obtained by tracking.

In some optional experimental implementations of this embodiment, an experiment operation matching the gesture operation may be determined according to the preset gesture operation associated with each experiment operation of the target experiment. The position of the experimental instrument image directing at the gesture operation is monitored. The experiment operation matching the gesture operation is determined as being finished when the position is in a preset target position, wherein the preset target position is associated with the experiment operation matching the gesture operation. In response to determining that the experiment operation matching the gesture operation is finished, preset experiment effect information associated with the finished experiment operation is determined.

In some optional experimental implementations of this embodiment, experiment operation prompt information may be displayed, so that the user performs an experiment operation according to the experiment operation prompt information. Optionally, before the target experiment is started, all experiment operation prompt information of the target experiment may be displayed on the display part of the augmented reality device. Furthermore, before each operation step of the target experiment is started, the experiment operation prompt information of this step may be displayed on the display part of the augmented reality device.

Step 204: displaying, using the augmented reality approach, the experiment effect image in the experimental environment image having presented the status image.

In this embodiment, the electronic device may display, using the augmented reality approach, the experiment effect image in the experimental environment image having presented the status image.

In this embodiment, displaying, using the augmented reality approach, the experiment effect image in the experimental environment image having presented the status image may comprise superposing the virtual experiment effect image into the experimental environment image on which the user has a visual sense of immersion, wherein the displaying the status image on the experiment effect image specifically comprises displaying the experiment effect image on the experimental instrument image correspondingly.

Figure 3:
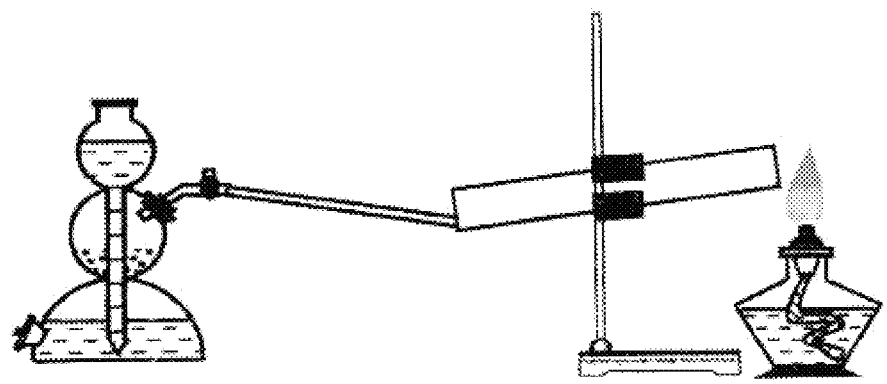
FIG. 3 is a schematic diagram of an application scenario of the display method according to the present disclosure.

Continuing referring to FIG. 3, a schematic diagram of an application scenario of the display method according to this embodiment is shown. In the application scenario as shown in FIG. 3, the user first selects a target experiment from preset experiments, for example, selecting a "hydrogen combustion and continuous explosion experiment". Next, the augmented reality device may acquire an experimental environment image, which comprises an experimental instrument image, for example, Kipp's apparatus, delivery tube, hard glass tube and alcohol burner. Next, the augmented reality device presents, using an augmented reality approach, a status image of the experimental instrument on the experimental instrument image, wherein the status image is an image indicating the experimental status of the experimental instrument when performing the target experiment. Of course, the experimental environment image is also presented when presenting the status image, for example, a flame image is presented on the image of the alcohol burner. Next, in response to detecting the user's gesture operation, the augmented reality device determines the experiment effect information of the experiment operation based on the corresponding relation between the gesture operation and the experiment operation of the target experiment, for example, the Kipp's apparatus starts generating hydrogen when detecting that the user looses a clamp on the delivery tube. The augmented reality device displays, using the augmented reality approach, an experiment effect image in the experimental environment image having presented the status image, wherein the experiment effect image is a flame image indicating the flame of the alcohol burner is light-blue.

According to the method provided by the embodiment of the present disclosure, by acquiring an experimental environment image, presenting, on the experimental instrument image using an augmented reality approach, a status image indicating an experimental status of an experimental instrument when performing the target experiment, in response to detecting a gesture operation of a user, determining experiment effect information of an experiment operation based on a corresponding relation between the gesture operation and the experiment operation of the target experiment, wherein the experiment effect information comprises an experiment effect image, and displaying, using the augmented reality approach, the experiment effect image in the experimental environment image having presented the status image, a virtual status image and an experiment effect image may be superposed on a reality environment image, thereby enhancing a display fidelity.

Figure 4:
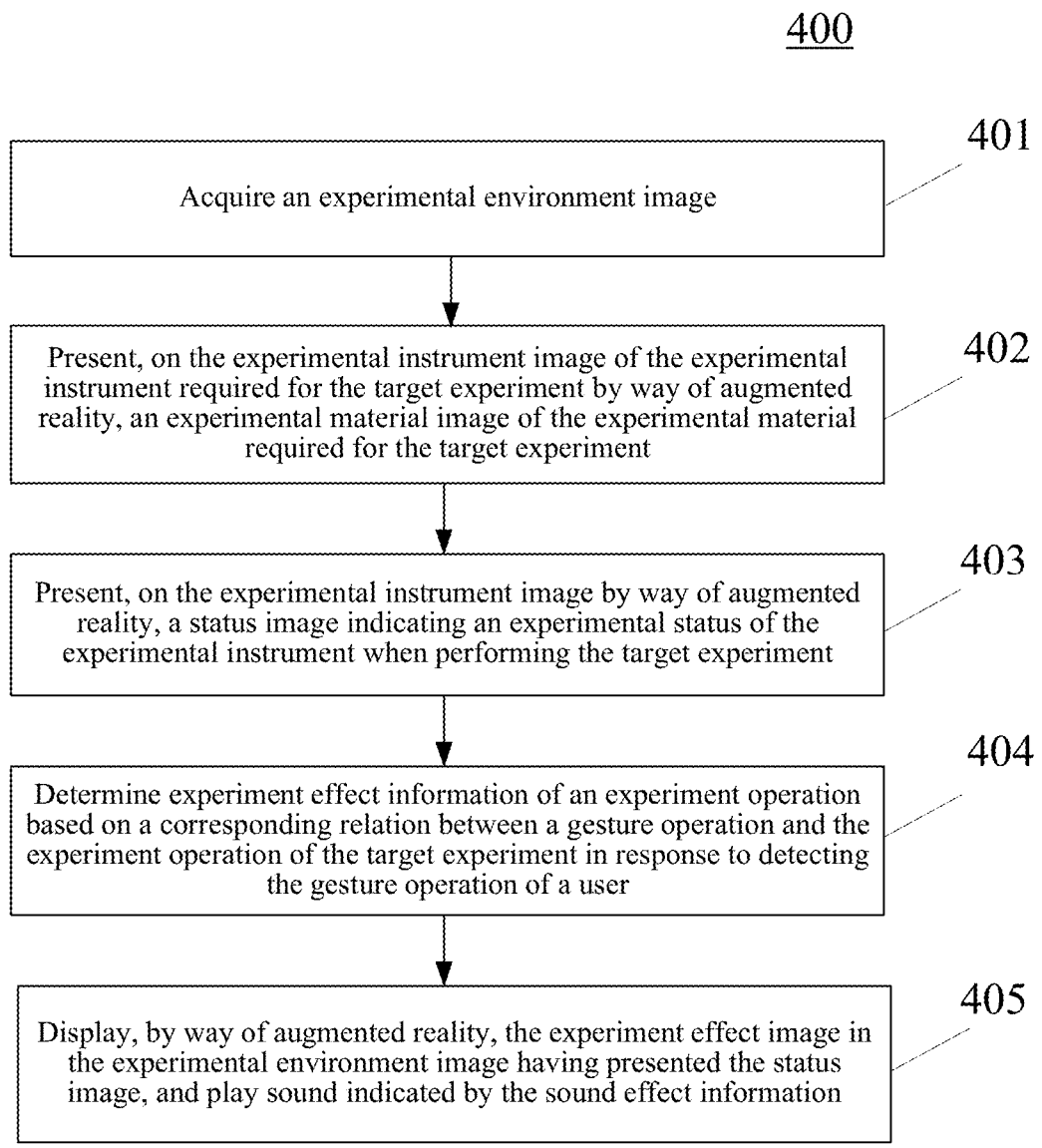
FIG. 4 is a flowchart of a display method according to another embodiment of the present disclosure.

Further referring to FIG. 4, a flow 400 of the display method according to still another embodiment is illustrated. The flow 400 of the display method comprises following steps.

Step 401: acquiring an experimental environment image.

In this embodiment, an electronic device (such as the augmented reality device as shown in FIG. 1) on which the display method runs may receive, by various means, the experimental environment image. Herein, the experimental environment image comprises an experimental instrument image of an experimental instrument for completing a target experiment.

Step 402: presenting, on the experimental instrument image of the experimental instrument required for the target experiment using the augmented reality approach, an experimental material image of the experimental material required for the target experiment.

In this embodiment, the electronic device (such as the augmented reality device as shown in FIG. 1) on which the display method runs may present, on the experimental instrument image of the experimental instrument required for the target experiment using the augmented reality approach, an experimental material image of the experimental material required for the target experiment.

In this embodiment, the experimental material required for the target experiment and the experimental instrument required for the target experiment are different. As an example, for chemical experiments, the experimental instruments may comprise: test tubes, beakers, evaporation pans, crucibles, alcohol burners and the like, and the experimental materials may be chemicals. For biology experiments, the experimental instruments may comprise tweezers and scalpels, and the experimental materials may be to-be-dissected organisms.

As an example, when the experimental materials are some hazardous experimental chemicals such as sulfuric acid, an image indicating a liquid state may be superposed on a test tube image of the test tube to avoid using the physical entity, sulfuric acid. In this way, the experimental safety is enhanced.

Step 403: presenting, on the experimental instrument image using an augmented reality approach, a status image indicating an experimental status of the experimental instrument when performing the target experiment.

In this embodiment, the electronic device may present the status image on the experimental instrument image using the augmented reality approach. Herein, the status image may be a status image indicating the experimental status of the experimental instrument when performing the target experiment.

Step 404: in response to detecting a gesture operation of a user, determining experiment effect information of an experiment operation based on a corresponding relation between the gesture operation and the experiment operation of the target experiment.

In this embodiment, the electronic device may determine experiment effect information of an experiment operation based on a corresponding relation between the gesture operation and the experiment operation of the target experiment in response to detecting the gesture operation of the user. Herein, the experiment effect information may comprise an experiment effect image and sound effect information.

In some optional implementations of this embodiment, the experiment effect information further comprises smell sense effect information, for example, scent information.

Step 405: displaying, using the augmented reality approach, the experiment effect image in the experimental environment image having presented the status image, and playing sound indicated by the sound effect information.

In this embodiment, the electronic device may display, using the augmented reality approach, the experiment effect image in the experimental environment image having presented the status image, and play sound indicated by the sound effect information.

As an example, in the hydrogen combustion and explosion experiment, weak but continuous "puff, puff" sounds generated during hydrogen combustion and explosion may be played.

As can be seen from FIG. 4, compared with the embodiment corresponding to FIG. 2, the flow 400 of the display method in this embodiment highlights the step of adding an experimental material image using the augmented reality approach and simulating a sound effect of an actual experiment. Thus, the solution as described in this embodiment may enhance the experimental safety and display fidelity.

Figure 5:
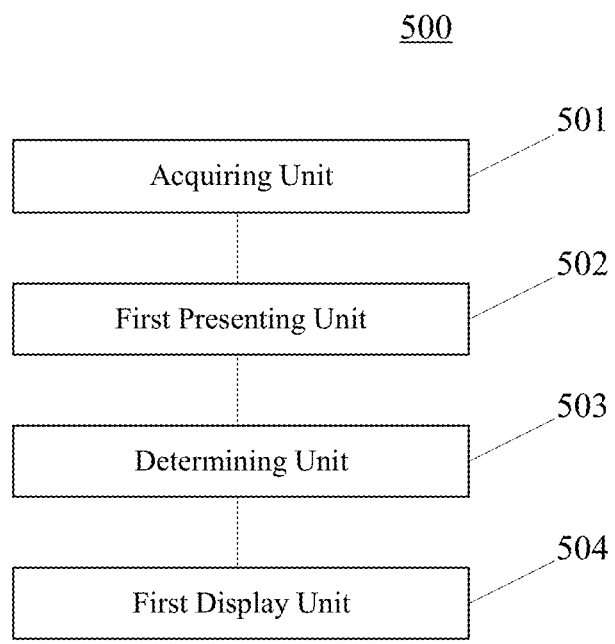
FIG. 5 is a schematic structural diagram of a display apparatus according to an embodiment of the present disclosure.

Further referring to FIG. 5, as an implementation of the method as shown in the foregoing figures, the present disclosure provides an embodiment of a display apparatus. The apparatus embodiment corresponds to the method embodiment as shown in FIG. 2, and the apparatus specifically may be used in various electronic devices.

As shown in FIG. 5, the display apparatus 500 in this embodiment comprises: an acquiring unit 501, a first presenting unit 502, a determining unit 503 and a first display unit 504. The acquiring unit 501 is configured to acquire an experimental environment image, wherein the experimental environment image comprises an experimental instrument image of an experimental instrument for completing a target experiment. The first presenting unit 502 is configured to present, on the experimental instrument image using an augmented reality approach, a status image indicating an experimental status of the experimental instrument when performing the target experiment. The determining unit 503 is configured to in response to detecting a gesture operation of a user, determine experiment effect information of an experiment operation based on a corresponding relation between the gesture operation and the experiment operation of the target experiment, wherein the experiment effect information comprises an experiment effect image. The first display unit 504 is configured to display, using the augmented reality approach, the experiment effect image in the experimental environment image having presented the status image.

In this embodiment, the acquiring unit 501 of the display apparatus 500 may acquire the experimental environment image in various ways. Herein, the experimental environment image comprises an experimental instrument image of an experimental instrument for completing a target experiment.

In this embodiment, the first presenting unit 502 of the display apparatus 500 may present the status image on the experimental instrument image using the augmented reality approach. Herein, the status image may be a status image indicating the experimental status of the experimental instrument when performing the target experiment.

In this embodiment, the determining unit 503 of the display apparatus 500 may determine experiment effect information of an experiment operation based on a corresponding relation between a gesture operation and the experiment operation of the target experiment in response to detecting the gesture operation of the user. Herein, the experiment effect information may comprise an experiment effect image.

In this embodiment, the first display unit 504 of the display apparatus 500 may display, using the augmented reality approach, the experiment effect image in the experimental environment image having presented the status image.

In some optional implementations of this embodiment, the experiment effect information may comprise sound effect information, and the apparatus may further comprise: a playing unit (not shown), configured to play sound indicated by the sound effect information using the augmented reality approach.

In some optional implementations of this embodiment, the experimental instrument image may comprise an image of the experimental instrument for holding an experimental material required for the target experiment, and the apparatus may further comprise: a second presenting unit (not shown), configured to present, on the experimental instrument image of the experimental instrument required for the target experiment using the augmented reality approach, an experimental material image of the experimental material required for the target experiment.

In some optional implementations of this embodiment, the display apparatus 500 may further comprise: a second display unit (not shown), configured to display experiment operation prompt information so that the user performs an experiment operation according to the experiment operation prompt information.

In some optional implementations of this embodiment, the display apparatus 500 may further comprise: an experimental identification acquiring unit (not shown), configured to acquire an experimental identification selected by the user; and a target experiment determining unit (not shown), configured to determine an experiment indicated by the experimental identification as the target experiment.

Reference may be made to the description of other embodiments of the present disclosure for technical implementation details and technical effects of this embodiment, which is not repeated any more herein.

Figure 6:
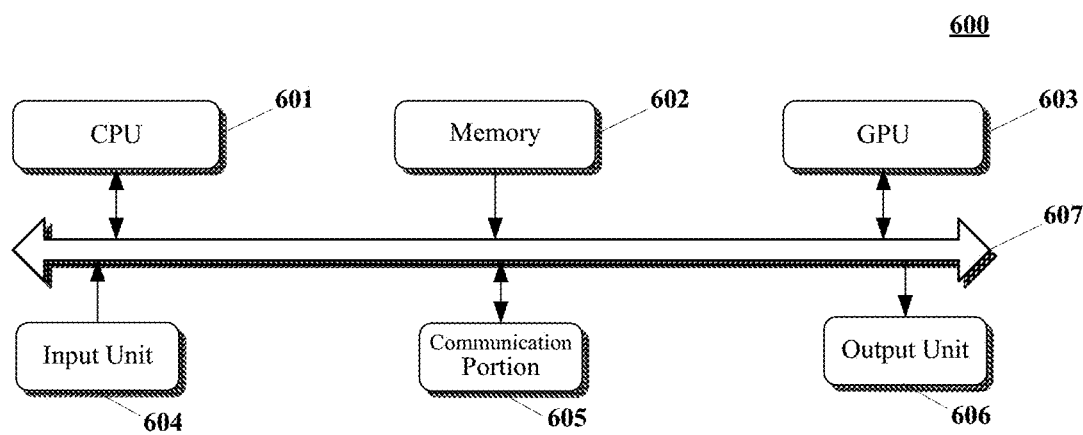
FIG. 6 is a structural schematic diagram of an augmented reality device adapted to implement the embodiments of the present disclosure.

Referring to FIG. 6, a hardware structural diagram of a augmented reality device 600 with display functions is shown.

As shown in FIG. 6, the augmented reality device 600 includes a central processing unit (CPU) 601, memory 602, a Graphics Processing Unit (GPU) 603, an input unit 604, a communication portion 605 and an output unit 606. The CPU 601, the ROM 602 the GPU 603, the input unit 604, the communication portion 605 and the output unit 606 are connected to each other through a bus 607. The CPU 601 and/or the GPU 603 in the augmented reality device 600 can implement the view display functions described in the present application by invoking computer programs on the memory 602. In some embodiments, the input unit 604 may be device that can acquire environment information and gesture information, such like sensors and cameras. Therefore, the CPU 601 and/ or the GPU 603 can control the input unit 604 to acquire the environment information and gesture information from exterior when invoking the computer programs to perform view display functions and control the output unit 606 to display the view. The communication portion 605 performs communication processes via a network, such as the Internet.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising an acquiring unit, a first presenting unit, a determining unit and a first display unit, where the names of these units or modules are not considered as a limitation to the units or modules. For example, the acquiring unit may also be described as "a unit for acquiring an experimental environment image".

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into a terminal. The non-volatile computer storage medium stores one or more programs. The one or more programs, when executed by a device, cause the device to: acquire an experimental environment image, wherein the experimental environment image comprises an experimental instrument image of an experimental instrument for completing a target experiment; present, on the experimental instrument image using an augmented reality approach, a status image indicating an experimental status of the experimental instrument when performing the target experiment; in response to detecting a gesture operation of a user, determine experiment effect information of an experiment operation based on a corresponding relation between the gesture operation and the experiment operation of the target experiment, wherein the experiment effect information comprises an experiment effect image; and present, using the augmented reality approach, the experiment effect image in the experimental environment image having presented the status image.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A display method, comprising:
   localizing, by a first camera of a display apparatus, visual sense of a user in real time to determine a view of the user;
   capturing, by a second camera of the display apparatus, experimental environment information included in the view of the of user determined by the first camera to generate an experimental environment image;
   presenting the experimental environment image by a display of the display apparatus, the experimental environment image comprising an experimental instrument image of an experimental instrument for completing a target experiment, and the experimental instrument being separated from the display apparatus and being located within the view of the user;
   presenting via the display, on the experimental instrument image using an augmented reality approach, a status image indicating an experimental status of the experimental instrument when performing the target experiment;
   detecting a gesture operation by:
   (i) obtaining a parallax image by stereo matching after acquiring a calibrated stereo image pair subject to stereo calibration;

(ii) acquiring a depth image by performing a trigonometric calculation using intrinsic parameters and extrinsic parameters of the binocular camera based on the parallax image;

(iii) processing a left or right vision image based on the depth image by using a gesture segmentation algorithm to acquire an initial position of a human hand;

(iv) determining the initial position of the human hand as an initial position of a gesture tracking algorithm;

(v) tracking a movement of the human hand using the gesture tracking algorithm; and (vi) recognizing the gesture operation according to a result obtained by the tracking;

in response to detecting the gesture operation of the user on the experimental instrument image, determining by the display apparatus experiment effect information of an experiment operation based on a corresponding relation between the gesture operation and the experiment operation of the target experiment, the experiment effect information comprising an experiment effect image; and displaying via the display, using the augmented reality approach, the experiment effect image in the experimental environment image having the presented status image and the experimental instrument image.

2. The method according to claim 1, wherein the experiment effect information further comprises sound effect information and the method further comprises:

playing a sound indicated by the sound effect information.

3. The method according to claim 2, wherein the experimental instrument image comprises an image of the experimental instrument for holding an experimental material required for the target experiment; and the method further comprises:

presenting, on the experimental instrument image of the experimental instrument required for the target experiment using the augmented reality approach, an experimental material image of the experimental material required for the target experiment.

4. The method according to claim 1, further comprising:

displaying experiment operation prompt information so that the user performs an experiment operation according to the experiment operation prompt information.

5. The method according to claim 4, further comprising:

acquiring an experimental identification selected by the user; and determining an experiment indicated by the experimental identification as the target experiment.

6. The method according to claim 1, wherein the gesture operation of the user is acquired by using a depth camera.

7. The method according to claim 1, wherein the visual sense is localized using a monocular camera or a binocular camera.

8. The method according to claim 1, wherein the display apparatus is an augmented reality helmet.

9. A display apparatus, comprising:

at least one processor; and a memory storing instructions, which when executed by the at least one processor, cause the at least one processor to perform operations, the operations comprising:

localizing, using a first camera, visual sense of a user in real time to determine a view of the user;

capturing, using a second camera, experimental environment information included in the view of the of user determined by the first camera to generate an experimental environment image;

presenting the experimental environment image, the experimental environment image comprising an experimental instrument image of an experimental instrument for completing a target experiment, and the experimental instrument being separated from the display apparatus and being located within the view of the user;

presenting, on the experimental instrument image using an augmented reality approach, a status image indicating an experimental status of the experimental instrument when performing the target experiment;

detecting a gesture operation by:

(i) obtaining a parallax image by stereo matching after acquiring a calibrated stereo image pair subject to stereo calibration;

(ii) acquiring a depth image by performing a trigonometric calculation using intrinsic parameters and extrinsic parameters of the binocular camera based on the parallax image;

(iii) processing a left or right vision image based on the depth image by using a gesture segmentation algorithm to acquire an initial position of a human hand;

(iv) determining the initial position of the human hand as an initial position of a gesture tracking algorithm;

(v) tracking a movement of the human hand using the gesture tracking algorithm; and (vi) recognizing the gesture operation according to a result obtained by the tracking;

in response to detecting the gesture operation of the user on the experimental instrument image, determining experiment effect information of an experiment operation based on a corresponding relation between the gesture operation and the experiment operation of the target experiment, the experiment effect information comprising an experiment effect image; and displaying, using the augmented reality approach, the experiment effect image in the experimental environment image having presented the status image and the experimental instrument image.

10. The apparatus according to claim 9, wherein the experiment effect information further comprises sound effect information; and the operations further comprises:

playing a sound indicated by the sound effect information.

11. The apparatus according to claim 10, wherein the experimental instrument image comprises an image of the experimental instrument for holding an experimental material required for the target experiment; and the operations further comprises:

presenting, on the experimental instrument image of the experimental instrument required for the target experiment using the augmented reality approach, an experimental material image of the experimental material required for the target experiment.

12. The apparatus according to claim 9, the operations further comprising:

displaying experiment operation prompt information so that the user performs an experiment operation according to the experiment operation prompt information.

13. The apparatus according to claim 12, the operations further comprising:

acquiring an experimental identification selected by the user; and determining an experiment indicated by the experimental identification as the target experiment.

14. A non-transitory computer storage medium storing a computer program, which when executed by one or more processors, cause the one or more processors to perform operations, the operations comprising:

localizing, using a first camera, visual sense of a user in real time to determine a view of the user;

capturing, using a second camera, experimental environment information included in the view of the of user determined by the first camera to generate an experimental environment image;

presenting via a display of a display apparatus the experimental environment image, the experimental environment image comprising an experimental instrument image of an experimental instrument for completing a target experiment, and the experimental instrument being separated from the display apparatus and being located within the view of the user;

presenting, on the experimental instrument image using an augmented reality approach, a status image indicating an experimental status of the experimental instrument when performing the target experiment;

detecting a gesture operation by:
  (i) obtaining a parallax image by stereo matching after acquiring a calibrated stereo image pair subject to stereo calibration;
  (ii) acquiring a depth image by performing a trigonometric calculation using intrinsic parameters and extrinsic parameters of the binocular camera based on the parallax image;
  (iii) processing a left or right vision image based on the depth image by using a gesture segmentation algorithm to acquire an initial position of a human hand;
  (iv) determining the initial position of the human hand as an initial position of a gesture tracking algorithm;
  (v) tracking a movement of the human hand using the gesture tracking algorithm; and
  (vi) recognizing the gesture operation according to a result obtained by the tracking;

in response to detecting the gesture operation of the user on the experimental instrument image, determining by the display apparatus experiment effect information of an experiment operation based on a corresponding relation between the gesture operation and the experiment operation of the target experiment, wherein, the experiment effect information comprises an experiment effect image; and displaying via the display, using the augmented reality approach, the experiment effect image in the experimental environment image having presented the status image and the experimental instrument image.

* * * * *